Figure 6:
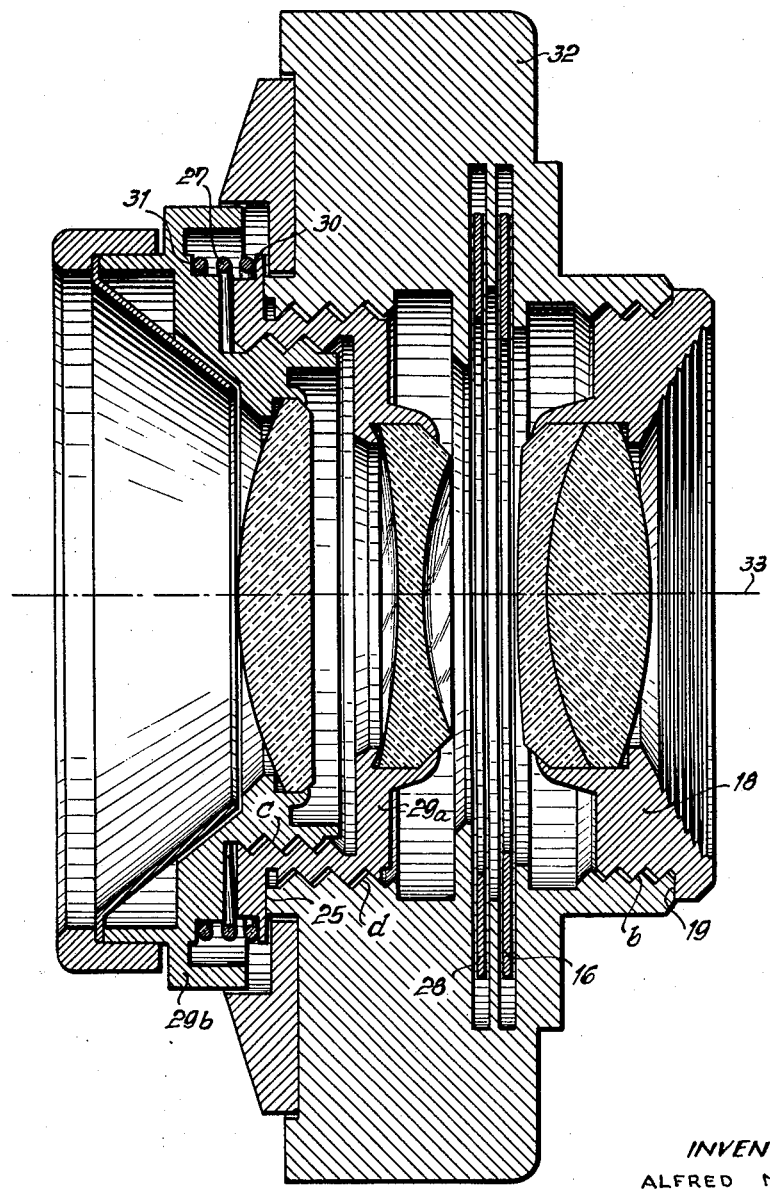

July 28, 1964   A. MEIXNER   3,142,239
MOUNT FOR PHOTOGRAPHIC OBJECTIVES
Filed Oct. 22, 1958   4 Sheets-Sheet 1
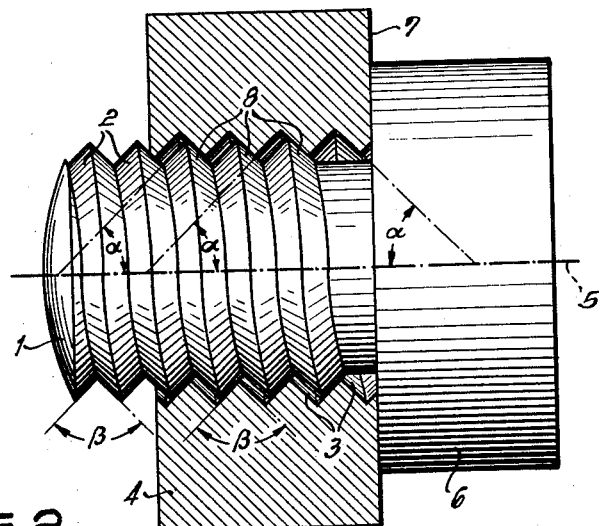
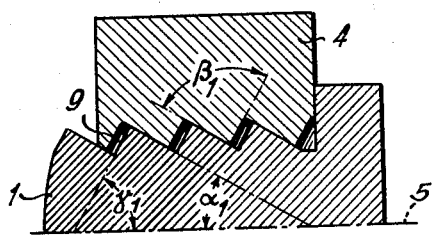
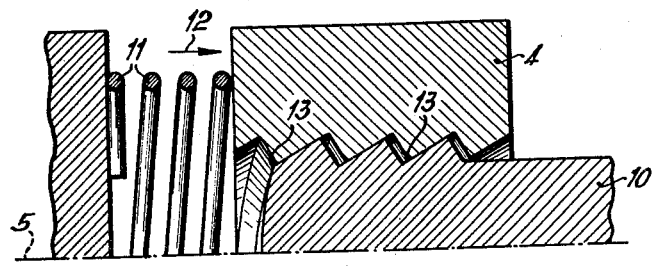
INVENTOR
ALFRED MEIXNER
BY Mocker Blum
ATTORNEYS

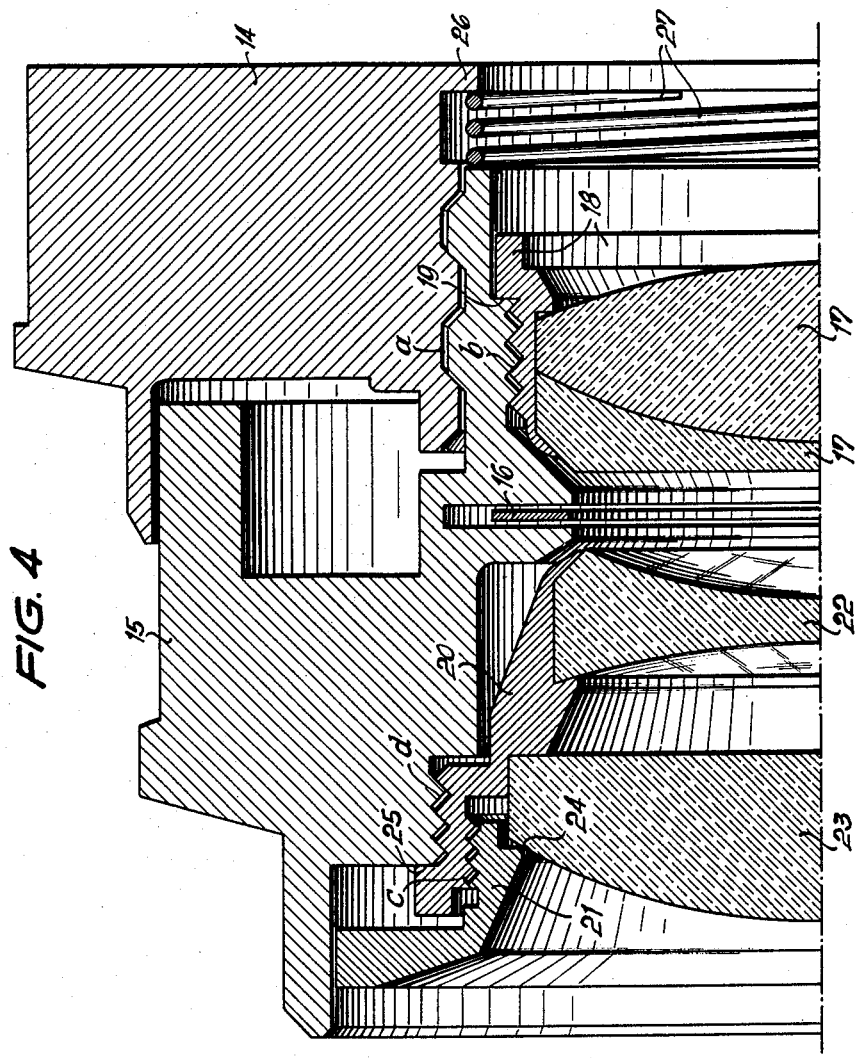

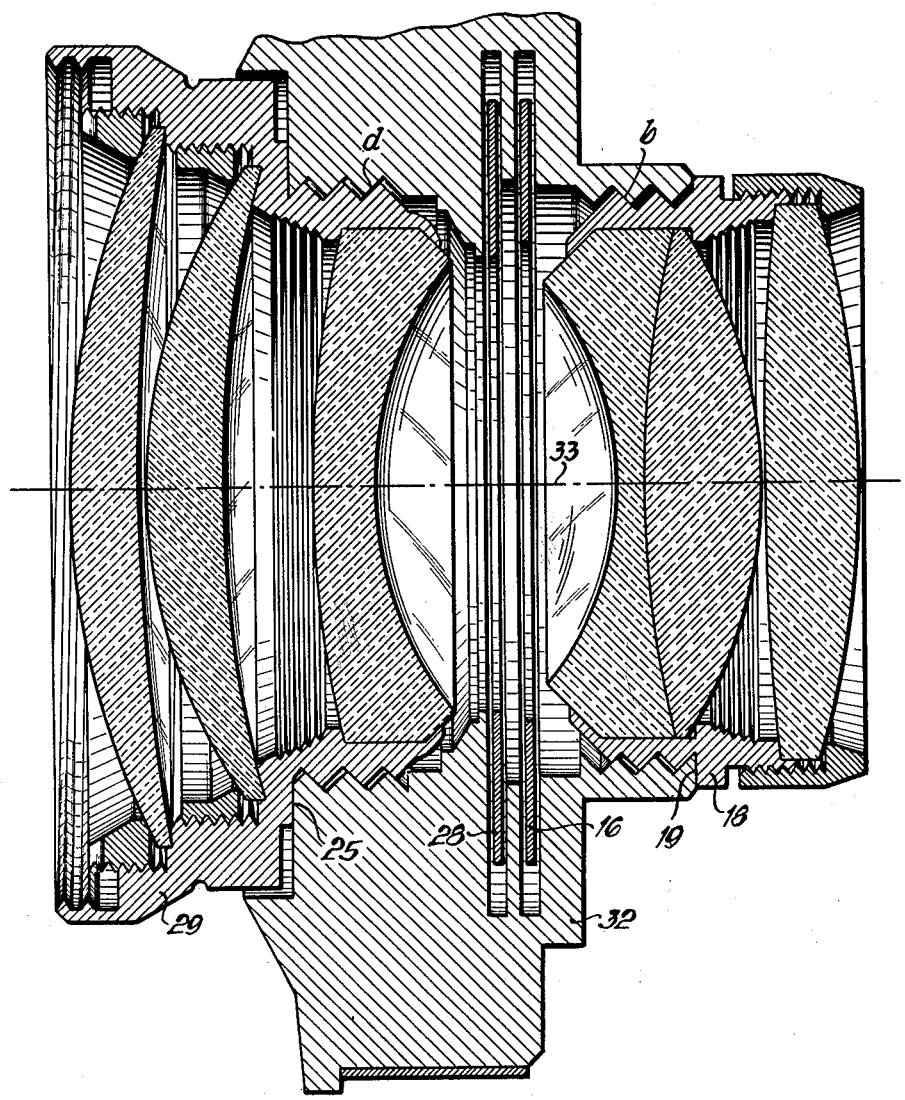

July 28, 1964   A. MEIXNER   3,142,239
MOUNT FOR PHOTOGRAPHIC OBJECTIVES
Filed Oct. 22, 1958   4 Sheets-Sheet 4

INVENTOR
ALFRED MEIXNER
BY Mock & Blum
ATTORNEYS

United States Patent Office 3,142,239
Patented July 28, 1964

3,142,239
MOUNT FOR PHOTOGRAPHIC OBJECTIVES
Alfred Meixner, Braunschweig, Germany, assignor to Voigtländer A.G., Braunschweig, Germany, a corporation of Germany
Filed Oct. 22, 1958, Ser. No. 768,876
4 Claims. (Cl. 95—44)

This invention relates to a mount for objectives of photographic cameras.

It has been known that the quality of photographic objectives depends not only on the successful design and construction, but to a particularly high extent also on the accuracy of manufacture of the objective assembly.

Eccentricity of individual lenses in the objective and even a parallel displacement of the axis of one or more lenses, relative to the optical axis of the total objective, as well as wobbling of lenses, are particularly harmful and prevent the obtaining of exact pictures in spite of satisfactory design of the objective system. The fewer there are of such manufacturing defects, the better will be the optical results obtainable in the objective.

The main object of the present invention is to keep the errors or defects occurring in the assembly of several lenses to an objective as small as possible. Thereby, it is assumed that the manufacture of the individual lenses including their own centering and mounting was carried out in satisfactory manner. In this connection the fact has to be taken into consideration that sensitive optical systems consisting of several lens members, which are mounted or are provided with adjusting rings, are always exposed to the danger of such decentration, especially when they are assembled by threading into the carrier member, e.g. in a tube. This is usually due to the play between the threaded parts, and it is so common that it has to be, in general, considered as an exception if, in spite of the beforementioned play, the two parts to be threaded together fit in such manner that the combined lenses are actually in correct centering position relative to each other and to the axis of the optical system. As a practical matter, satisfactorily accurate centering of male and female members formed with the before-mentioned screwthreads is not obtainable. One reason is that most of the optical members, arranged to be assembled by threading, are previously pickled and blackened. Another reason is that subsequent formation of the screw-thread results in flanks having too high a degree of roughness.

It has been known to arrange a fitting cylinder in order to improve the optical adjustment. But even if thereby the narrowest tolerances, which can be attained in manufacture, i.e. (h 6 and H 6), are used, the resulting accuracy is still not satisfactory, because a play, which is harmful with regard to exact centering of the system, is still present.

It has also been suggested to provide, on the mount of removable member, as well as on the carrying part therefor, cooperating conical centering surfaces for the purpose of maintaining proper optical adjustment. When this suggestion is used, a gauge fitting is substituted for the individual threaded mount or the fitting cylinder mount. However, this method of using conical facets has the undesired effect that the adjustment of members or lenses relative to each other, within the optical system, causes greater difficulties with regard to the air space to be observed between them, than in the case of a plane surface.

For assembling objective parts by screwing, in general standard threads have been used which have an angle of 60° between the flanks of the thread, as well as between the thread flank and the axis of the thread. Such standard threads having a flank angle of 60°, serve also in optical devices merely for mutual fixing of parts relative to each other, and are not suitable and cannot be used for obtaining high centering precision.

According to the present invention, the centering of individual parts in objectives, which are assembled by screwing the parts together, is simplified and greatly improved.

In carrying out this invention, the mount for photographic objectives comprises a base member which is fastened to the camera. This base member is provided with threads threadedly receiving an objective front member and an objective rear member and these threads are shaped as self-centering threads, in which the flanks lying in the direction of tightening, form an angle smaller than 60° with the axis of the thread. For tightening the threaded parts, stop means, consisting of plane facing shoulders perpendicular to the axis of the threads, are provided on the parts.

It has now been discovered that the effect of decentration can be essentially eliminated by suitable selection of the angle of one flank of the thread. It has been found that, if the angle between the flank and the axis of the thread is selected to be smaller than the standard angle of 60°, then the beforementioned difficulties can be successfully eliminated, as confirmed by numerous tests.

It is within the scope of the present invention to form the self-centering thread as a symmetrical thread or as a saw tooth thread. In the case of the symmetrical thread, the angle between the flanks preferably about 90°, and each flank is at an angle of about 45° to the axis of the thread. Thus, the thread will have an equal centering effect in both directions of adjustment during tightening. In the case of an asymmetrical thread, only one flank, i.e. the flank which is at a smaller angle to the axis of the thread, is capable of bringing about the centering effect. Therefore it is used in such manner that this last mentioned flank is in the direction of tightening.

The invention can be applied to mounting threads for lenses, threaded adjusting rings for holding lenses, and adjusting threads for sharp focusing of an objective either for displacement of the total objective or of the front lens.

In general, the male member which is to be assembled with a female member by threading thereinto, and which is provided with a centering thread, also has a terminal stop or abutment by means of which the thread of the male member is tightened, at the limit of movement of the male member, within the guiding female thread. In effect, the male thread is drawn up within the female thread with the flanks of the male thread sliding along the corresponding flanks of the female thread until the male and female members are exactly centered.

In the case of transport threads, which have to be centered in any desired position, the same effect can be obtained if one of the parts screwed together is tightened by pressure or pull, for example, by means of a spring, relative to the other part, so that the thread flanks having a centering effect are permanently pressed toward each other. For a slight adjustment of such a thread, it is only necessary that the part which is under the spring effect be axially displaced to some extent.

The appended drawings illustrate by way of example and without limitation some embodiments of and best modes for carrying out the invention, to which the invention is not limited. In the drawings;

FIGS. 1, 2, and 3 are part axial sectional views of threadedly interconnected bolts and nuts, the threads being illustrated on a greatly enlarged scale to emphasize the principle of the invention;

FIG. 4 is a radial sectional view through a photographic objective and its mount, embodying the present invention; and FIGS. 5 and 6 are axial sectional views of modified forms of objectives embodying the present invention.

Referring to the drawings in detail, in FIG. 1, reference numeral 1 denotes a threaded bolt, the threads 2 of which engage the thread grooves 3 of a nut 4. The thread shown here is a symmetrical thread, the flanks of which form an angle $\alpha$, of less than 60°, i.e. an angle of about 45°, with the axis 5 of the screw thread. Thus, the angle $\beta$ formed by the flanks of a thread tooth 2 or of a thread groove 3 amounts to about 90°. If now the bolt 1 is completely threaded into nut 4, its head 6 will engage surface 7 of nut 4 to limit further movement of bolt 1 relative to nut 4. As a result of this limitation of movement, the flanks 8 of the thread of bolt 1, facing in the direction of tightening, are firmly pressed against the mating flanks of the thread of nut 4. The relatively small angle of inclination of these flanks relative to the axes of the threads, facilitates sliding of the flanks on each other to effect self-centering of the bolt 1 in exact coaxial relation with the nut 4. FIG. 1 shows the bolt in this centered position after the thread has been firmly tightened. In this symmetrical thread, the centering would occur in the same manner if the head 6 of the bolt were arranged on the other side of bolt 1. However, in this case the other thread flanks would engage each other.

FIG. 2 illustrates a combination of threaded bolt 1 and nut 4 as in FIG. 1, however in the case of an asymmetrical thread. The carrying flanks, i.e. the flanks which have a centering effect upon tightening of the thread, form an angle $\alpha_1$, of 30° with the axis 5 of the thread. As the angle $\beta_1$ which is formed by the flanks of a thread tooth amounts also in this case to about 90°, the stiffer flank 9 forms an angle $\gamma_1$, of 60°, with the axis 5 of the thread. This inclination corresponds to that of a standard thread and is therefore not sufficient for bringing about the automatic centering effect.

Accordingly, a saw tooth thread of this type can be used only in one direction, i.e. in the direction shown in FIG. 2.

In FIG. 3, bolt 10 and nut 4 have cooperating saw tooth threads serving as transport or adjustment threads. As bolt 10 has no head which could abut against nut 4 to effect the centering tightening of the nut and the bolt, there is provided, in this case, a coil spring 11 engaged between a fixed part and nut 4 and biasing nut 4 in the direction of arrow 12. Thereby, the more gently sloping flanks of the thread of nut 4 slide over the mating more gently sloping flanks of the thread of bolt 10 to effect automatic centering adjustment. Of course, instead of the nut, the bolt could be subjected to pressure. However, in view of the asymmetrical thread, the spring would have to act in a direction opposite to that shown in FIG. 3.

FIG. 4 illustrates in sectional view a mounted photographic objective, which, for its total adjustment, is guided in a worm gear $a$ of shutter 14. The objective tube is denoted 15 and the diaphragm arranged therein is denoted 16. The rear member 18, which contains a double lens 17, is threaded into objective tube 15 at $b$ and has a stop at 19. The front mounting, which is composed of the mounting member 20 and the mounting ring 21 threaded into it at $c$, is threaded into objective tube 15 at $d$. Mounting member 20 carries the diverging lens 22 and forms the back seat for the front lens 23 whose front surface has mounting ring 21 seating thereon at 24. At 25, the front mounting 20 abuts a shoulder formed on objective mounting 15. All of the threads, $b$, $c$ and $d$ are self-adjusting in a similar manner upon tightening against shoulders or stops 19, 24, 25. Objective mounting 15 is permanently pressed by a compression spring 27 engaging a collar or flange 26, against the flanks of the adjusting thread in worm gear $a$. All four threads ($a$, $b$, $c$ and $d$) are of symmetrical shape in the example shown and their flanks form an angle of about 45° with the axis of the thread. Owing to this inclination, and under the effect of tightening or the spring effect, all adjusting elements of the objective, guided in threads, are centered to the same axis of the thread, so that the optical axes (which correspond to the axis of the thread) of all optical members (22, 23 and 17) here concerned are aligned with each other and the objective is adjusted with complete accuracy.

While prior to the present invention precision centering in photographic objectives could not be obtained without the use of adjusting members, such as fitting or adjusting cylinders or cones, according to this invention centering precisions of, for example, 0.002 mm. can be easily obtained. This improvement is particularly remarkable and unexpected in view of the numerous unsuccessful attempts directed to the elimination of the troublesome and expensive conventional centering means and in view of the fact that the problem solved by the present invention was previously unsolved in spite of several decades of extensive research work. In carrying out the present invention, high precision of centering can be obtained by simple assembling of the respective parts, practically automatically, even if the assembled systems are repeatedly taken apart and reassembled, and the advantages of the invention are attained in a technically simple and economical manner.

FIG. 5 illustrates in sectional view a photographic objective including a closure or cover member 32, a mount rear member 18 and a mount front member 29. Rear member 18 is located behind the diaphragm lamellae 16 and connected with member 32 by means of a centering thread $b$ designed according to the present invention. Upon engagement of the plane surfaces of member 32 and rear member 18, which are indicated at 19, centering thread $b$ is tightened and brings about centering of the rear member 18 relative to optical axis 33. In a similar manner front member 29 is threaded into member 32 by means of thread $d$ designed according to the present invention, and the shoulders indicated at 25 as perpendicular to the optical axis 33, and centered relative to the optical axis 33.

The objective illustrated in sectional view in FIG. 6 differs from the objective illustrated in FIG. 5, in that the objective mount front part, which is threaded with centering, in member 32, is sub-divided into two parts 29$a$ and 29$b$, of which part 29$b$ serves for displacement of the front lens. A tight pressure spring 27, engaging by plane surfaces 30 and 31 which are perpendicular to the optical axis 33, effects precise centering of the front lens through threads $c$, which are designed in accordance with the present invention.

It will be noted, in each of FIGS. 1 through 6, that the root diameter of the female threads is sufficiently in excess of the apex or maximum diameter of the male threads that the male and female elements threadedly interfit loosely with substantial play therebetween except when the diametrically extending and facing plane surfaces are interengaged.

It will be understood from the above that this invention is not limited to the specific construction, designs, angles and other details specifically described above and illustrated in the drawing, can be applied to various optical systems used in photographic apparatus and can be carried out with various modifications without departing from the scope of the invention as defined in the appended claims.

Reference is made to my co-pending application filed under Ser. No. 561,281 on January 25, 1956, now abandoned, of which this is a continuation in part.

What is claimed is:

1. A mount assembly for objectives of photographic cameras comprising, in combination, threadedly interconnected substantially cylindrical male and female members, the threaded portions of said members being of uniform diameter throughout the axial length of the threaded portions; lens means carried by said male member; facing diametrically extending integral plane surfaces on said members interengageable upon tightening of said male member into said female member; the root diameter of the female threads being sufficiently in excess of the apex diameter of the male threads that said two members threadedly interfit loosely with substantial play therebetween except when said plane surfaces are interengaged; the flanks of the male thread facing the diametrically extending plane surface of said male member forming a first angle of not in excess of 45 degrees with the axis of said male member; the flanks of the female thread facing in a direction away from the diametrically extending plane surface of said female member forming a second angle of not in excess of 45 degrees with the axis of said female member and substantially equal to said first angle; the apex angles of both threads being 90 degrees; said flanks of the female thread engaging and sliding along said flanks of the male thread, as said plane surfaces are brought into firm engagement upon tightening of said members, to center said male member in said female member.

2. Mount assembly for objectives of photographic cameras as claimed in claim 1, in which the respective threads have a symmetrical design.

3. A mount assembly for objectives of photographic cameras comprising, in combination, a female base member constructed and arranged to be removably secured to the camera, and having a set of female threads at each end thereof; a pair of male members having male threads arranged for threading into the respective sets of female threads, one of said male members constituting a front lens mounting member and the other male member constituting a rear lens mounting member; the threaded portions of all of said members being of uniform diameter throughout the axial length of the threaded portions; said female member having diametrically extending integral plane surfaces at each end, each facing a diametrically extending integral plane surface on one of said male members and interengageable with the resepective such facing surface on tightening of the respective male member into said female member; the root diameter of the female threads being sufficiently in excess of the apex diameter of the associated male threads that said female member threadedly interfits loosely with said male members with substantial play therebetween except when said facing plane surfaces are interengaged; the flanks of the male threads forming a first angle of substantially 45 degrees with the axis of the respective male members, and the flanks of the female threads forming a second angle of substantially 45 degrees with the axis of the female member and substantially equal to said first angle; the apex angles of both threads being 90 degrees; the male threads and the female threads being symmetrical, the flanks of the respective female threads engaging and sliding along the facing flanks of the respective male threads, as said facing plane surfaces are brought into firm engagement upon tightening of said male members into said female members, to center said male members in said female members.

4. A mount assembly for objectives of photographic cameras comprising, in combination, threadedly interconnected substantially cylindrical male and female members, the threaded portions of said members being of uniform diameter throughout the axial length of the threaded portions; lens means carried by said male member; facing diametrically extending integral plane surfaces on said members interengageable upon tightening of said male member into said female member; the root diameter of the female threads being sufficiently in excess of the apex diameter of the male threads that said two members threadedly interfit loosely with substantial play therebetween except when said plane surfaces are interengaged; the flanks of the male thread facing the diametrically extending plane surface of said male member forming a first angle of not in excess of 45 degrees with the axis of said male member; the flanks of the female thread facing in a direction away from the diametrically extending plane surface of said female member forming a second angle of not in excess of 45 degrees with the axis of said female and substantially equal to said first angle; the apex angles of both threads being 90 degrees; said flanks of the female thread engaging and sliding along said flanks of the male thread, as said plane surfaces are brought into firm engagement upon tightening of said members, to center said male member in said female member; and the entire engagement between the plane surfaces being effected by spring means operatively associated with said members and biasing said flanks into engagement.

References Cited in the file of this patent

UNITED STATES PATENTS

| | | |
|---|---|---|
| 277,408 | Carleton | May 8, 1883 |
| 2,093,026 | Bernhard | Sept. 14, 1937 |
| 2,238,371 | Pollock | Apr. 15, 1941 |
| 2,328,602 | Bechler | Sept. 7, 1943 |
| 2,370,223 | Beuer | Feb. 27, 1945 |
| 2,503,789 | Wood et al. | Apr. 11, 1950 |
| 2,511,212 | Lee | June 13, 1950 |
| 2,606,778 | Myhre | Aug. 12, 1952 |
| 2,772,899 | Evans | Dec. 4, 1956 |

FOREIGN PATENTS

| | | |
|---|---|---|
| 239,486 | Great Britain | June 24, 1926 |